(12) United States Patent
Gelbart

(10) Patent No.: US 9,201,234 B2
(45) Date of Patent: Dec. 1, 2015

(54) AUTOMATED SLIDE SCANNING SYSTEM FOR A MICROSCOPE

(76) Inventor: William Gelbart, Garden Bay (CA)

(*) Notice: Subject to any disclaimer, the term of this patent is extended or adjusted under 35 U.S.C. 154(b) by 222 days.

(21) Appl. No.: 13/820,516

(22) PCT Filed: Oct. 20, 2011

(86) PCT No.: PCT/CA2011/050662
§ 371 (c)(1),
(2), (4) Date: May 12, 2013

(87) PCT Pub. No.: WO2012/051718
PCT Pub. Date: Apr. 26, 2012

(65) Prior Publication Data
US 2013/0222895 A1    Aug. 29, 2013

Related U.S. Application Data

(60) Provisional application No. 61/455,502, filed on Oct. 22, 2010.

(51) Int. Cl.
*G02B 21/34* (2006.01)
*G02B 21/24* (2006.01)
(Continued)

(52) U.S. Cl.
CPC .............. *G02B 21/34* (2013.01); *G02B 21/006* (2013.01); *G02B 21/0036* (2013.01); *G02B 21/241* (2013.01); *G02B 21/365* (2013.01)

(58) Field of Classification Search
CPC .... G02B 21/00; G02B 21/0016; G02B 21/06; G02B 21/24; G02B 21/241; G02B 21/244; G02B 21/26; G02B 21/34; G02B 21/36; G02B 21/361; G02B 21/362; G02B 21/365; G06K 9/00127; G06T 7/0012
USPC ......... 359/362–363, 368, 383, 385, 390, 391, 359/392–392; 250/201.2–201.4
See application file for complete search history.

(56) References Cited

U.S. PATENT DOCUMENTS

| 3,135,817 A | * | 6/1964 | Wrigglesworth et al. | .... 359/379 |
| 3,600,568 A | * | 8/1971 | Weyrauch | ..................... 362/551 |

(Continued)

FOREIGN PATENT DOCUMENTS

| CA | 2227177 A1 | 1/1998 |
| WO | 2010076244 A2 | 7/2010 |

OTHER PUBLICATIONS

"Simple Machines," University of Arkansas—Agriscience Project, Published online Jun. 18, 1997, http://www.uark.edu/depts/aeedhp/agscience/simpmach.htm, Accessed Feb. 2, 2015.*

(Continued)

*Primary Examiner* — Stephone B Allen
*Assistant Examiner* — Adam W Booher

(57) ABSTRACT

An automated slide scanning system is described. The system comprises an automated focusing unit that is simple and that provides a fine adjustment of a focusing tube without any backlash. The focusing unit comprises a block that is cut or fabricated in a pattern forming a head to support a focusing tube and at least one elongated and rigid arm projecting perpendicularly from the head. One end of the at least one arm is integrally joined to the head. The focusing unit further comprises an elongated, rigid, lever which is substantially parallel and spaced apart from the at least one arm. The lever is pivotally mounted to a hinge and has a first end that is linked to the head of the focusing unit and a second free end. The focusing unit further includes a drive mechanism with a roller coupled to a motor. The roller is eccentric roller and is in constant contact to the lever's second end. When the roller rotates it engages the lever which subsequently engages the at least one arm and thus produces a substantially vertical movement in both direction to the head of the focusing unit. The scanning system further comprises a scanning stage that supports the focusing unit and which provides a continuous movement in Y-direction (back and forward) of the scanning stage, and a scanning track that moves the slide holder continuously in one direction along the x-axis until the last slide in the slide holder is scanned. The scanning system of the present invention is suitable for automated screening or pre-screening of samples.

15 Claims, 8 Drawing Sheets

(51) Int. Cl.
*G02B 21/00* (2006.01)
*G02B 21/36* (2006.01)

(56) References Cited

U.S. PATENT DOCUMENTS

| | | | |
|---|---|---|---|
| 4,270,838 A * | 6/1981 | Furusawa et al. | 359/385 |
| 4,575,199 A * | 3/1986 | Lisfeld | 359/392 |
| 5,262,891 A * | 11/1993 | Nakasato | 359/385 |
| 5,672,816 A * | 9/1997 | Park et al. | 73/105 |
| 6,049,421 A * | 4/2000 | Raz et al. | 359/394 |
| 6,711,283 B1 | 3/2004 | Soenksen | |
| 6,714,347 B2 * | 3/2004 | Pensel et al. | 359/381 |
| 6,847,481 B1 * | 1/2005 | Ludl et al. | 359/391 |
| 6,927,389 B2 * | 8/2005 | Curry et al. | 250/234 |
| 2009/0231689 A1 | 9/2009 | Pittsyn et al. | |
| 2011/0115897 A1 | 5/2011 | Najmabadi et al. | |

OTHER PUBLICATIONS

Comprehensive cervical cancer control: a guide to essential practice, World Health Organization 2006.
International Search Report and Written Opinion for International Application No. PCT/CA2011/050662, mailed Jan. 19, 2012, in 7 pages.
Simple Machines, University of Arkansas—Agriscience Project.

* cited by examiner

AUTOMATED SLIDE SCANNING SYSTEM FOR A MICROSCOPE

This application claims priority from U.S. Provisional Patent Application No. 61/455,502, filed Oct. 22, 2010.

BACKGROUND OF THE INVENTION

1. Field of the Invention

The present invention relates to a method and apparatus for automated scanning of microscope slides and more particularly it relates to an automated slide scanning system with a focusing unit suitable for use in automated screening or pre-screening of samples.

2. Background of the Invention

Traditional approach of slide scanning system for microscope includes an automated slide loader with slides holder and a motorized scanning (X-Y) stage for scanning the slides. Typically, the motorized X-Y microscope stage includes means for moving the slide relative to a microscope objective on two orthogonal (X and Y) axes to provide precise positioning of the slide, and possibly also on a third orthogonal (Z) axis to provide automatic focusing. Such systems can also be equipped with slide positioning stages to facilitate the positioning of successive slides and removing and storing them after scanning.

The slide scanning systems known in the prior art are typically bulky and heavy requiring a considerable amount of space. In addition, such systems are expensive, unreliable and complicated requiring a precise alignment and interface of the slide loader and the microscope. The focusing of such prior art scanning systems includes a screw or rack-and-pinion focus adjustment which causes backlash and hysteresis of the focusing unit. The transfer of the slides from the loader to the microscope can occasionally fail causing the system halt and slide damage during transfer. In most of the known prior art slide scanning systems, slides are stored vertically providing poor visibility of slide's labels. Also, with vertically stored slides systems manual retrieval of a specific slide is not a simple task because the slide labels are not clearly visible.

Accordingly, there is a need for a slide scanning device that is simple, reliable and low cost, and that mitigates the problems of the prior art. This can be achieved by departing from the traditional loader/microscope setup and by combining all functions of slide scanning system in one, simple device.

Other limitations of the prior art will become apparent upon reading the specification and study of the drawings.

SUMMARY OF THE INVENTION

Embodiments of an automated slide scanning system for scanning a plurality of slides are disclosed.

In one aspect, an automated slide scanning system is provided. The scanning system comprises a motorized scanning track configured to support and move a slide holder with a plurality of slides in X-direction. The motorized scanning track has a retaining means configured to grab the slide holder and a driving means to position the slide holder on the scanning track and move it in one direction along the X-axis until the last slide in the slide holder has been scanned. The automated slide scanning system further comprises a motorized focusing unit that moves up and down in Z-direction and provides a plurality of images at various focus depths. The focusing unit is a block with a head to support a focusing tube and at least one substantially rigid arm projecting perpendicularly from the head. The at least one arm has a first end integrally joined to the head and a second end. The focusing unit further includes an elongated substantially rigid lever pivotally connected to a hinge and a drive mechanism which is in constant contact with the lever. One end of the lever is linked to the head of the focusing unit while the opposite end is a free end. The lever is substantially parallel and spaced apart from the at least one arm. The drive mechanism engages the lever flexing it downwardly which subsequently engages the at least one arm, producing substantially vertical movement of the at least one arm and thus the head of the focusing unit. The focusing unit is supported by a motorized scanning stage that moves back and forward, in Y-direction, along the length of the slide. The scanning system further comprises an illumination system that produces an illumination light beam for illuminating an object carried by the slide and at least one image detection system for detected the plurality of images.

In another aspect, an illumination system is configured to be connected with a scanning stage and to move together with the scanning stage in Y-direction.

In yet another aspect, an automated focusing unit is provided. The focusing unit comprises a body with a head to support a focusing tube and at least one elongated, substantially rigid arm that projects perpendicularly from the head. One end of the at least one arm is integrally joined to the head. The focusing unit further comprises an elongated substantially rigid lever pivotally connected to a hinge and a drive mechanism with a cam that is coupled to a motor. One end of the lever is linked to the head of the focusing unit while the other end is a free end. The lever is substantially parallel and spaced apart to the at least one arm. The cam is in a constant contact to the lever so that when the motor rotates the cam it engages the lever which subsequently engages the at least one arm producing a vertical movement in both direction to the at least one arm which subsequently produces a vertical, both directional, movement of the head of the focusing unit.

In addition to the aspects and embodiments described above, further aspects and embodiments will become apparent by reference to the drawings and study of the following detailed description.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENTS OF THE INVENTION

The figures and the following descriptions depict specific embodiments to teach those skilled in the art how to make and use the best mode of the invention. However, those skilled in the art would appreciate that the features described below may be combined in various ways to form multiple variations of the invention.

Figure 1:
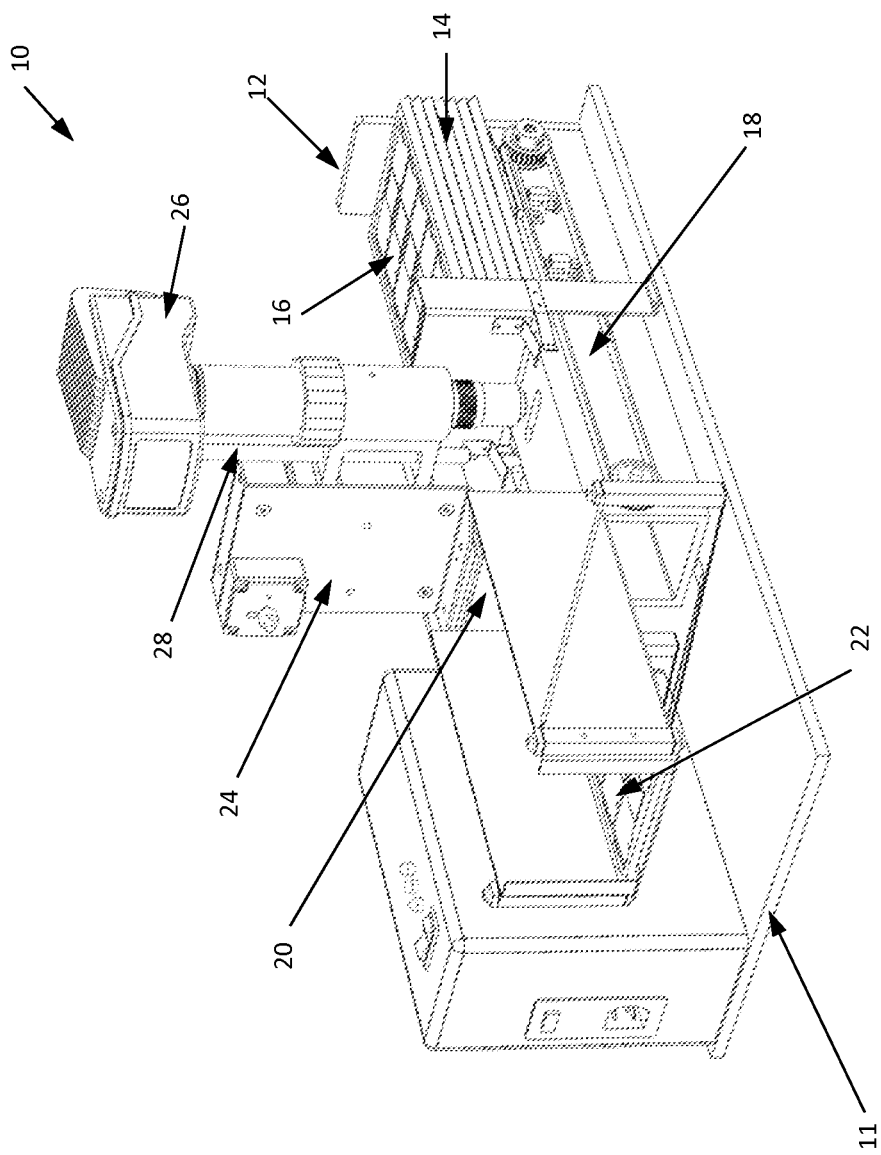
FIG. 1 is a perspective view of a slide scanner according to an embodiment of the present invention.

Referring to FIG. 1, a slide scanning system 10 of the present invention is provided. The system 10 can comprise a base 11 to support the slide scanning system 10, a slide holder dispenser 12, a scanning track 18, a scanning stage 20, a slide holder receiver 22 and a focusing unit 24. The system 10 further comprises an illumination system (not shown) to illuminate an object that is being scanned and an image detection system (camera 26 and/or an auxiliary camera 28) to provide plurality of images of the illuminated object.

The slide holder dispenser 12 can be designed to hold plurality of slide holders 14. The slide holders 14 can be stacked vertically within the slide dispenser 12. In one implementation, each of the slide holders 14 may be positioned within a respective guide of the slide dispenser 12 so that each slide holder 14 can be stacked independently and without engaging the neighboring slide holders 14. The slide holder dispenser 12 can be sized to accommodate a number of slide holders 14. For example, the slide dispenser 12 can accommodate ten slide holders 14 loaded one above the other. In another embodiment, different number of slide holders can be loaded in the slide dispenser 12.

Figure 2:
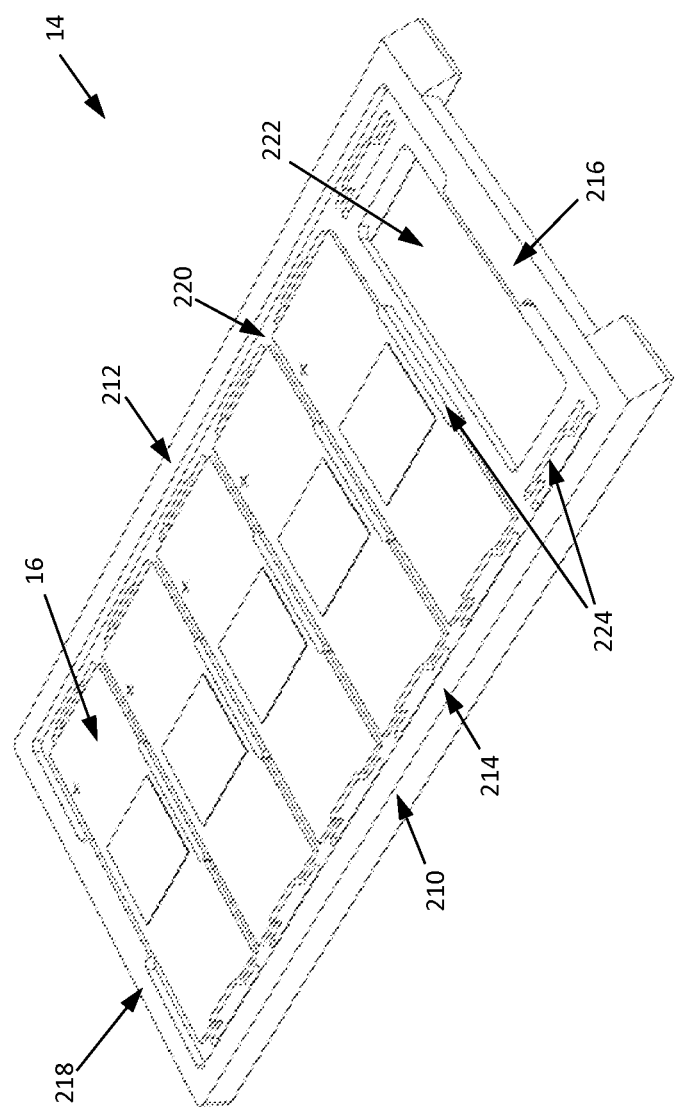
FIG. 2 is a perspective view of a slide holder according to an embodiment of the present invention loaded with 5 slides.

Each slide holder 14 can hold plurality of slides 16 placed horizontally in the dedicated slide holder. Details of the slide holder 14 are shown in FIG. 2. The slide holder 14 can comprise a rectangular frame 210 having two opposing side walls 212 and 214 and two end walls 216 and 218. The holder 14 further comprises a base 220 with a plurality of slots 222. Each slot 222 is designed so that a slide 16 carrying the object to be scanned is position in the base above such slot. Each slot 222 is separated from the neighboring slots by longitudinal flexible bars 224. Each slide holder can hold plurality of slides 16 placed horizontally in the slide holder 14. Number of the slides 16 in one slide holder 14 can vary depending on size and dimensions of the holder 14. For example, the holder 14 can contain six slides 16. In another embodiment, a larger or smaller set of slides than six can be placed in one slide holder 14. One of ordinary skills would understand that any known design of slide holder can be used with the slide scanning system 10 without departing from the scope of the invention.

Slides 16 can be held securely within the holder 14 by the plurality of longitudinal flexible bars 224. The flexible bars 224 can project upwardly from the base and can be designed to tightly engage longer and/or shorter edges of the slides 16.

Slide 16 can be inserted into the holder 14 by pressing the slide against the base 220 and deflecting the bars 224 sufficiently to allow insertion of the slide. Once inserted, the slide 16 is held securely by the flexible bars 224. One of ordinary skills will understand that slides 16 can be securely placed within the holder 12 by using various indentations, inserts or any other designs of flexible bars without departing from the scope of the invention.

In one implementation the frame 210 of the holder 14 can have an identifying label, for example a bar code which can be used to identify the slide holder by using some detection system, such as a bar code or optical character reader. In another implementation, each slide 16 can carry an identifying label, for example a bar code which can be used to identify a particular slide 16. Each slide and its label can be fully visible at all times. The holders can be stacked for storage and can occupy about the same amount of space as an equal number of slides stored in traditional slide storage systems.

Figure 3:
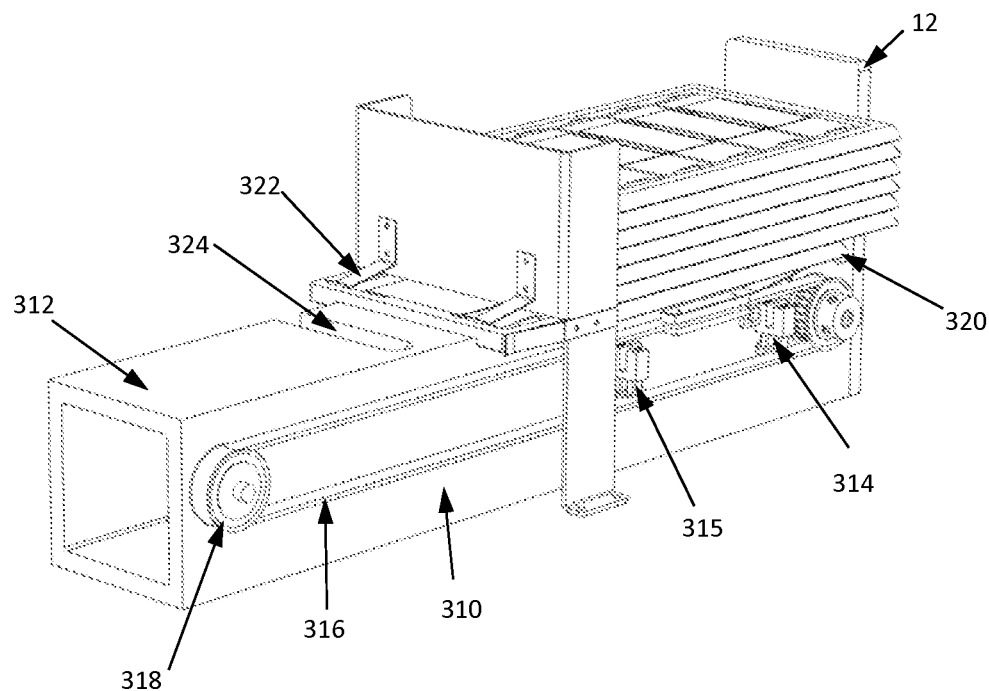
FIG. 3 is a perspective view of a slide scanning track with a drive mechanism according to an embodiment of the present invention.

The slide holder dispenser 12 can be attached to the slide scanning track 18 so that the slide holder 14 can be pulled out of the dispenser 12 and placed onto the scanning track 18. FIG. 3 depicts the scanning track 18 with a scanning track drive mechanism 310. The drive mechanism 310 can be configured to pull the slide holder 14 out of the dispenser 12 and provide linear movement of the slide holder in an X-direction from the end adjacent to the slide dispenser 12 toward the end adjacent to the slide holder receiver 22 (FIG. 1).

Figure 3A:
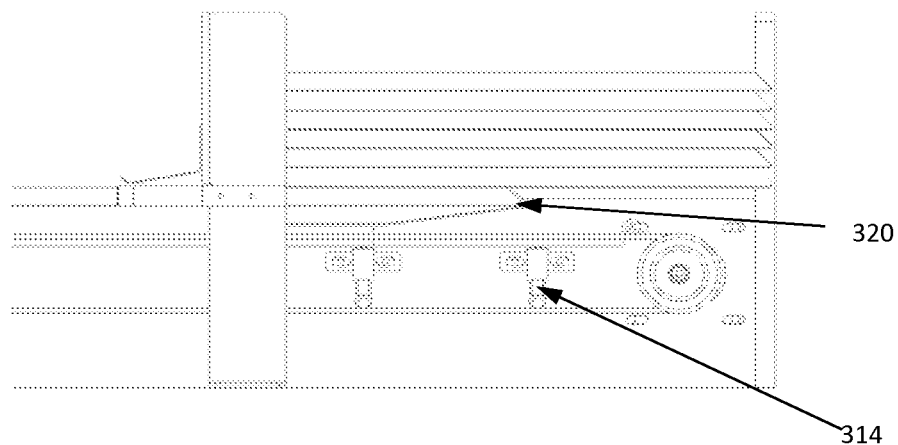
FIG. 3a is a perspective view of a retaining means of a slide scanning track drive mechanism according to an embodiment of the present invention.

In one implementation, the scanning track 18 can be a square pipe 312 that serves as a guide for the slide holders 14 and is a housing of the drive mechanism 310. The drive mechanism 310 can comprise a timing belt 316 driven by a motor 318. In one embodiment the motor 318 can be a stepper motor. Secured to the belt is a springy hook 320, shown in FIG. 3a. The springy hook 320 is design to grab the slide holder that is on the bottom of the dispenser 12 and pull it out of the slide dispenser 12 and place it onto the scanning track 18. The springy hook 320 is designed so that it is flexible enough to deflect under the slide holder 14 on its return travel. The hook 320 engages the slide holder 14 that is at the bottom of the slide holder dispenser 12, pulling it out of the dispenser 12 and placing it on the scanning track 18. At the beginning of the scanning process, the scanning track 18 positions the first slide in the holder under an objective of the system 10. It would be appreciated that any other means for securely holding and releasing the slide holder 14 can be used instead of the hook 320.

Position of the timing belt is determined by two limit switches 314 and 315. The limit switch 314 determines a position when the hook 320 is triggered to grab the slide holder 14 that is at the bottom of the slide dispenser 12. The limit switch 315 (start-of-travel switch) determines the starting position of the scanning process with the first slide positioned on the scanning track 18 under the objective of the scanning system 10. One or more hold-down leaf springs 322 can keep the slide holder 14 in an intimate contact with the track 18. The scanning track 18 further comprises a slot 324 that is provided to allow an illumination beam to pass through the slot 324 and illuminate the object carried by the slide 16. The track drive 310 provides linear movement, in one direction, of the slide holder. In one implementation, the speed of the scanning track can be controlled by a controller (not shown). The movement and the speed in X direction are adjusted according to the needs of the process and are controlled by the frequency of pulses to the motor 318.

At the start position, the limit switch 314 triggers the drive mechanism so that the hook 320 grabs the slide holder 14 that is at the bottom of the slide dispenser 12 and pulls it out of the dispenser 12. Once the first slide is positioned under the objective of the system 10 the switch 315 triggers the start of the scanning process. The scanning track 18 advances the slide holder 14 continuously, step-by-step, until the last slide in the slide holder is fully scanned. Then the drive mechanism 310 reverses leaving the scanned holder 14 in its place and the hook 320 pulls the next holder from the bottom of the dispenser 12 positioning the first slide under the objective for scanning. As the subsequent slide holder advances it pushes the previous slide holder out of the way and eventually into the slide-holder receiver 22. The total travel distance of the scanning track 18 in X direction is determined by a preprogrammed number of steps from the start-of-travel limit switch 315. In one implementation, the drive mechanism 310 may include an end-of-travel limit switch to define a travel distance of the scanning track 18 in X-direction. At the same time the end-of-travel limit switch can trigger the hook 320 to release the slide holder that has been scanned and to return back at its starting position.

Figure 4:
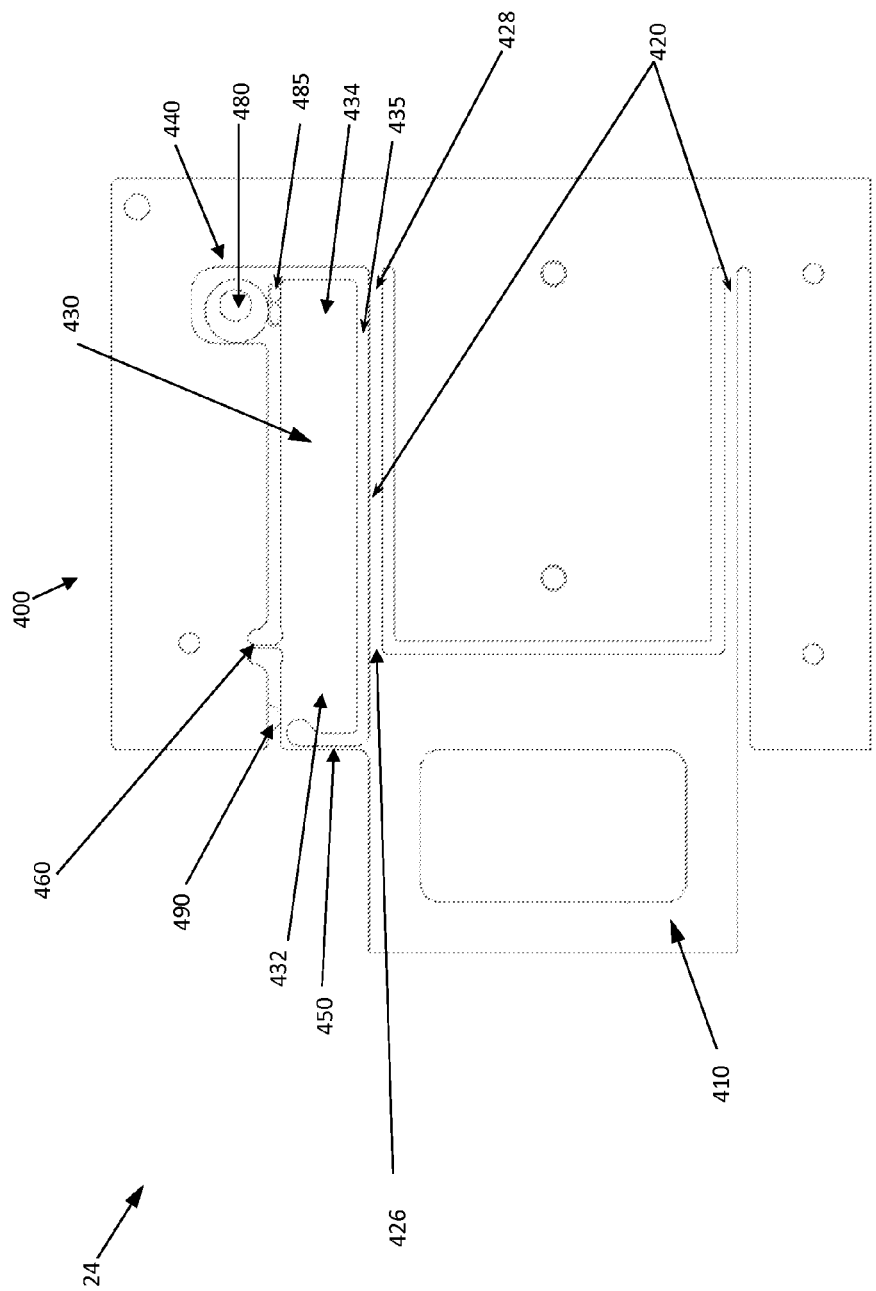
FIG. 4 is a side view of a focusing block according to an embodiment of the present invention.

Referring now to FIG. 4 the focusing unit 24 can be described. The focusing unit 24 comprises a block 400 that can be cut or fabricated in a pattern forming a head 410 and at least one substantially rigid arm 420 that projects perpendicularly from the head 410. The focusing unit 24 can provide parallel vertical motion and a leverage that magnifies this motion a few times. The head 410 is configured to support a focusing tube 510 (see FIG. 5). FIG. 4 shows a focusing unit 24 with two substantially rigid arms 420. One skilled in the art would understand that the block 400 can be cut so that fewer or more substantially rigid arms are formed without departing from the scope of the invention.

Each of the arms 420 has a first end 426 integrally joined to the head 410 and a second end 428. The second end 428 of the arm 420 can flex slightly downwardly when a force applies to it. When the second end 428 of the arm 420 flex slightly downwardly, the head 410 of the focusing unit 24 can move upwardly providing a substantially vertical movement to the focusing tube 510 and vice versa, when the second end 428 of the arm 420 returns up to its starting position the head 410 (and thus focusing tube 510) move accordingly downward.

The block 400 further comprises a substantially rigid lever 430 that is separated from the arm 420 by a gap 435. The lever 430 has a first end 432 connected to the head through a linkage 450, and a second, free, end 434. The lever 430 is pivotally connected to a hinge (pin) 460 that is configured and positioned to define a ratio leverage and thus magnification rate. The ratio leverage depends on a position of the hinge 460 along the length of the lever 430. In one implementation the ratio can be 1:5. In another embodiment, the ratio can be 1:10. One skill in the art would understand that smaller or larger ratio leverage can be provided depending on the position of the hinge 460 along the length of the lever 430.

In one implementation, the head 410, the arms 420 and the lever 430 can be manufactured as separate parts which can then be connected to form the block 400.

The focusing unit 24 further comprises a drive mechanism to provide a vertical movement (Z direction) of the focusing tube 510. The drive mechanism 440 can comprise a roller or a cam 480 coupled to a motor (not shown). The cam 480 is in constant contact with the lever 430. In some implementation the cam 480 can be an eccentric cam. Any other geometric shape or form can be used to provide substantially vertical movement of the lever 430. The continuous contact between the lever 430 and the cam 480 is provided by a spring 490 that continuously pushes in one direction on the first end 432 of the lever 430. The cam 480 driven by the motor rotates applying certain degree of a pushing force, depending on the position of the cam 480 to the lever 430. Under this force the lever's second end 434 flexes pushing on the second end 428 of the arm 420 thus providing a sub-micron, backlash free, vertical movement to the head 410. In one embodiment, the cam 480 can move at about 1000 increments. In another embodiment, larger or smaller increments can be provided. In one embodiment, the micro-stepping vertical movement in Z-direction of the focusing unit 24 can be controlled and synchronized by a controller. The extent of the vertical movement is defined by a radius of the cam/roller 480, position of the hinge 460 and a point of contact of the cam 480 to the lever's second end 434. The cam 480 can act directly on the second end 434 of the lever 430 or can act to the lever 430 through a fixed or adjustable follower 485. One skilled in the art would know that different geometries of the cam 480 can be provided without departing from the scope of the invention.

In operation, the focusing tube 510, which performs the focusing function, is supported by the head 410 of the focusing unit 24. The focusing tube is moved in a parallel motion supported by the arms 420. The movement is controlled by the lever 430 that is pivoted on the hinge 460. The ratio of the lever movement can be adjusted by the position of the hinge 460 and the point of contact of the second end 434 of the lever with the cam 480. By moving the focusing tube up and down a plurality of images at various focus depths are provided.

Figure 5:
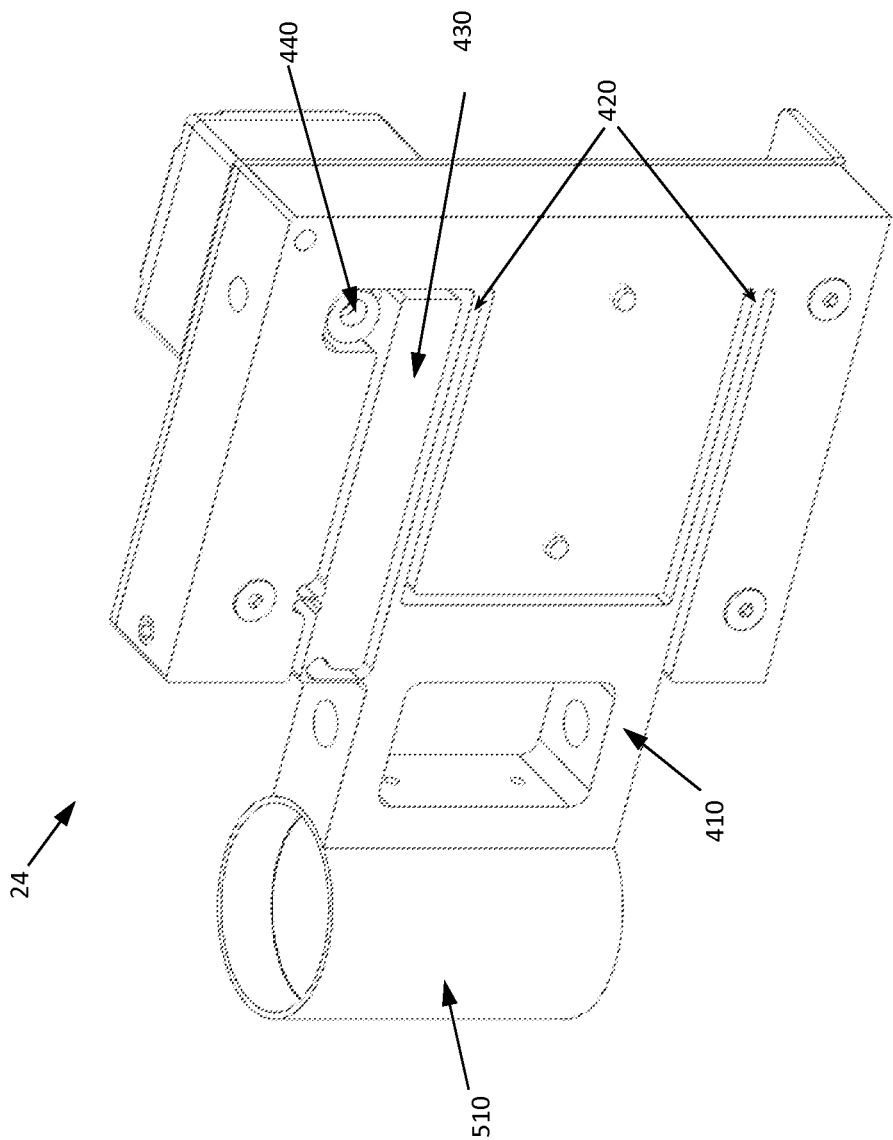
FIG. 5 is a perspective view of a focusing unit with one cover transparent showing inside of the focusing mechanism.

The focusing unit 24 showing the focusing block 400 and the focusing tube 510 is shown in FIG. 5. In one implementation, the focusing tube 510 can be pre-focused manually to the middle of the slide and locked so that a small area for observation is in a field of view. The focusing through the slide thickness (and any differences in the slide vertical position, cover glass placement, etc.) is done by flexing the lever 430 and the arms 420.

Figure 6:
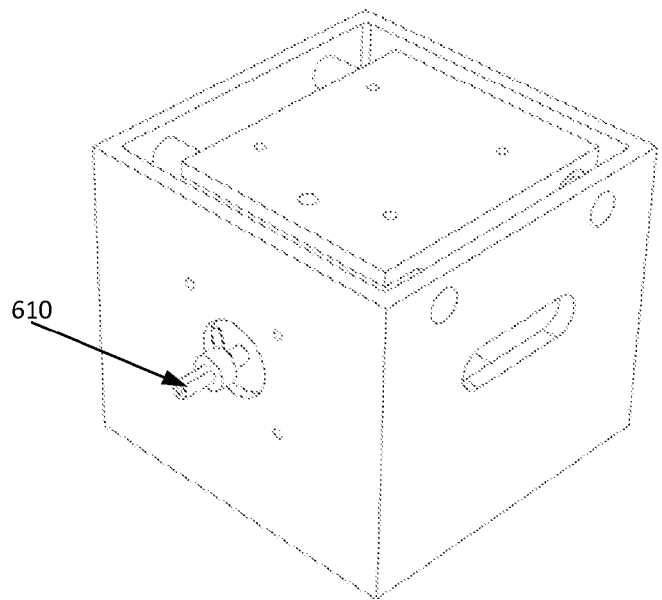
FIG. 6 is a perspective view of a scanning stage mechanism according to an embodiment of the present invention.
Figure 6A:
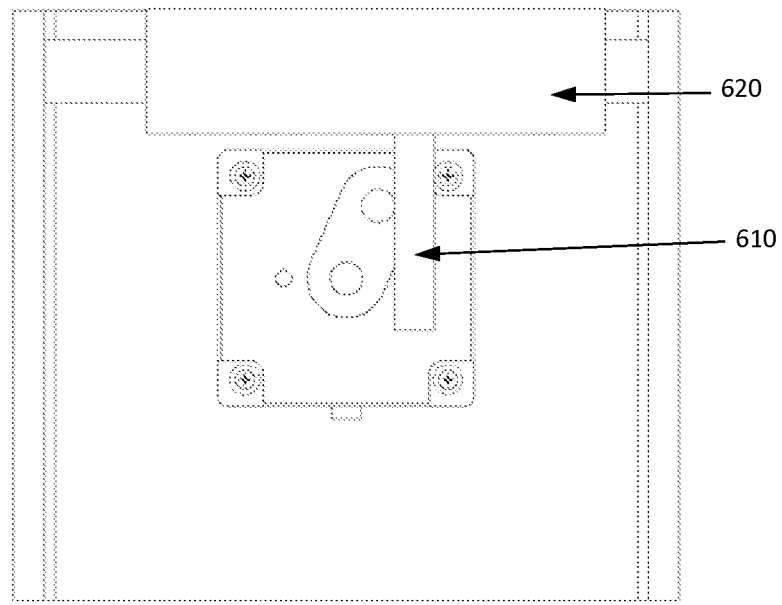
FIG. 6a is a top view of a scanning slide mechanism with a top plate removed to show an eccentric pin drive which is pre-loaded against the pin by a spring.

The focusing unit 24 is supported by the scanning stage 20. The scanning stage 20 can provide scanning of the slide in Y direction. The scanning stage 20 along with the focusing unit 24 moves back and forward along the distance of the scan (typically 25 mm, but could be more). Typically, conventional scanning stages use a lead-screw to achieve the movement in a Y-direction. FIGS. 6 and 6a show details of the scanning stage 20. The Y-direction movement of the scanning stage 20 can be provided by a pin 610 that is directly mounted on a motor 620. In one embodiment, the pin 610 may be an eccentric pin. Any other geometries and shapes of the pin 610 can be used. The sinusoidal advance can be corrected to translate into a linear motion. Travel distance along the length of the slide is determined by a limit switch actuated by the motor 620. The travel distance of the scanning stage 20 in Y direction is determined by a preprogrammed number of steps from the limit-switch. In one implementation, an additional limit switch can be provided to determine the end-of-travel of the scanning stage 20 in Y direction.

The object to be scanned is positioned on the slide 16 and is illuminated by an illumination system (not shown) that includes a light source and illumination optics. The light source can include a light emitting diode (LED), a lamp (a Xenon lamp, an arc-lamp, a halogen lamp) or a laser. In one implementation the light source is a LED that can be connected directly to the scanning stage 20 and can move together with the scanning stage 20. The scanning stage 20 along with the LED move continuously back and forward in Y direction scanning the object on the slide while the scanning track 18 advances that slide continuously in X direction. At the same time the focusing unit 24 moves the focusing tube 510 up and down in Z direction providing a plurality of images at various focus depths. The movement and the speed in X, Y and Z directions are adjusted according to the needs of the process and are controlled by the frequency of pulses of the motors e.g. motor 318 that drives the scanning track 18, the driving motor of the focusing unit and the scanning stage motor 620.

The light source provides a light beam that can pass through the illumination optics and the slot 324 to the slide that is position above the slot 324 and under the objective. The slot 324 is positioned in front of the light source and is aligned with the objective. An objective lens collects the light that transmits and/or reflects from the slide. This light can then be detected by the image detector, such as main camera 26 (FIG. 1) that provides an image of a small area (smaller than a total area) of the object carried by the slide. Typically, the image detector 26 is a charge coupled device (CCD) array or other optical imaging array capable of providing a multiple pixel image of the small area.

Figure 7:
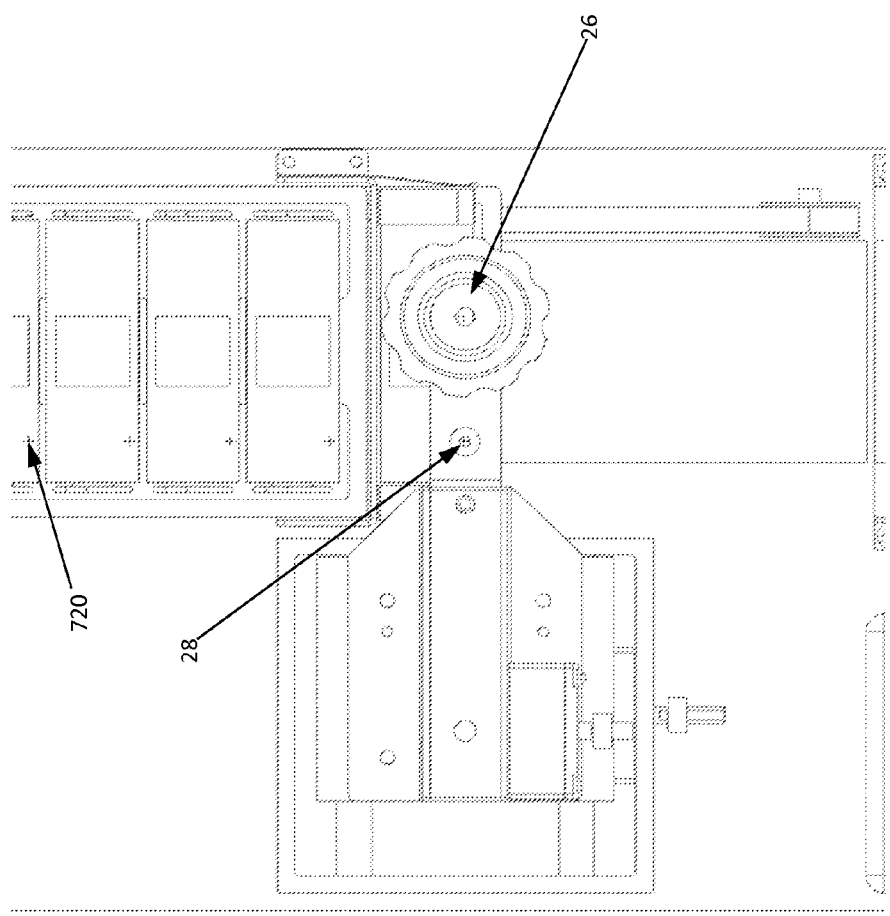
FIG. 7 is a top view of a slide scanner according to an embodiment of the present invention showing an image seen by an auxiliary camera.

In one implementation, the light that transmits and/or reflects from the slide can impinge on a beam splitter which can transmit part of the light to the main camera 26 while the other part of the light can be reflected to a second, auxiliary, camera 28. The auxiliary camera 28 is mounted in line and on the same support as the main focusing tube and records a position of a registration mark 720 (FIG. 7) on the slide 16. Each slide has a distinct mark, usually a cross-hair, in a fixed location on the glass. The mark 720 can indicate the position of the slide (edge of the slide) and/or a position of a particular feature of the scanning object. When the slide is placed for scanning position, the registration mark is in the field of view of the auxiliary camera 28. The camera 28 registers the position of the mark 720 in relation to its centre and then the drive mechanisms 310 of the scanning track 18 can correct the scanning starting position to compensate for any difference. This information is stored together with the slide data and can be used to later locate accurately any features in the slide image. This is very important if the slide is to be re-examined on the same or different system. In another embodiment, the second camera can be used as an area camera for locating edges of the object carried on the slide or can be replace with operator oculars. In another embodiment the object's edges can be located with a third area camera (not shown).

Figure 8:
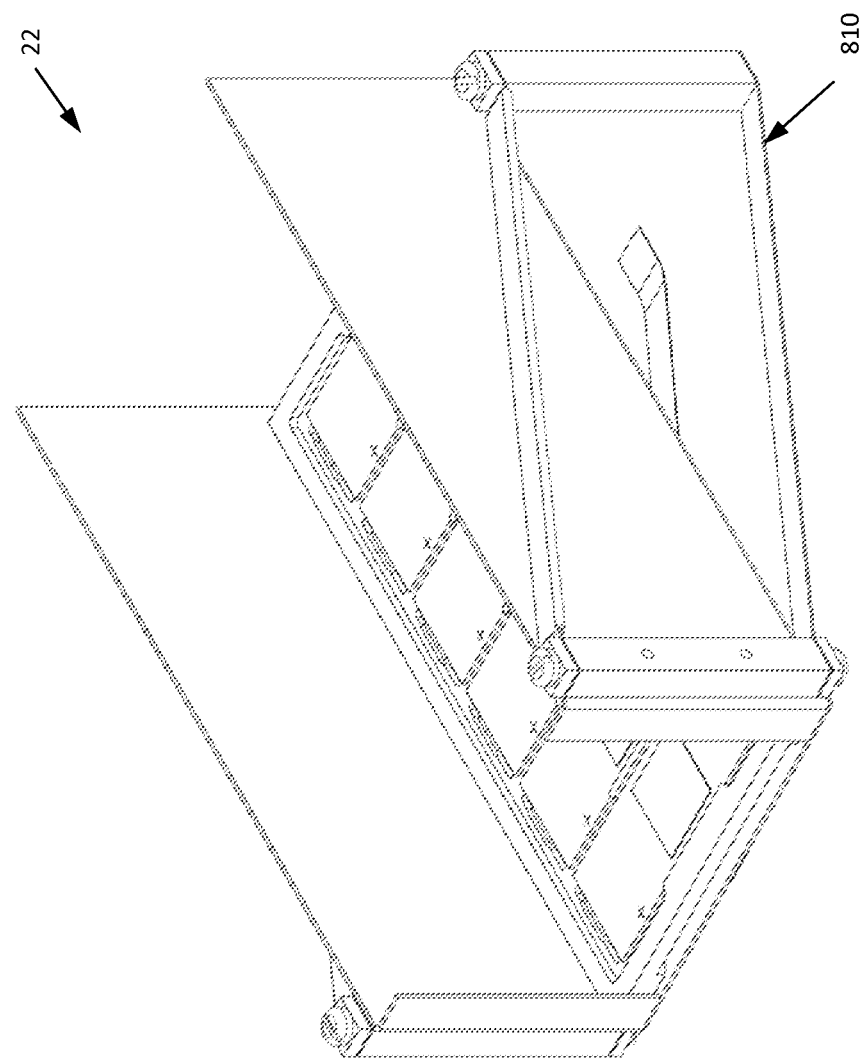
FIG. 8 is a perspective view of a slide holder receiver according to an embodiment of the present invention.

At the end of the travel each holder 14 is pushed from the track 18 into the receiver 22. FIG. 8 shows the slide receiver 22. The receiver is balanced by parallelogram leaf springs 810 that deflect by the weight of the holder through the distance of one holder thickness for each holder. Slide holders 14 can be removed during the scan operation. Holders 14 can be removed from the receiver 22 without interrupting the scan process. Once the receiver 22 is full, it actuates a limit switch (not shown) to stop further scans.

In one method of operation, slide holders 14 are stacked at the end of the scanning track 18 in the dispenser 12. When the scanning system 10 is turn on and instructed to scan, the hook 320 pulls the most bottom holder 14 out of the slide dispenser 12 and places the first slide under the objective. The focusing tube 510 can be manually pre-focused to the middle of the slide's image and locked. The scanning track 18 advances the slide continuously in X direction while the scanning stage 20 continuously moves back and forward along the length of the slide. At the same time the focusing tube 510 moves up and down in Z-direction providing images at various focus depths. When first slide is scanned, the track mechanism 318 advances the second slide under the objective. As the last slide is fully scanned, the track mechanism 318 reverses leaving the finished slide holder 14 in its place and the hook 320 pulls the next holder from the bottom of the dispenser 12. As the scanning track 18 advances the newly placed slide holder 14, it pushes the previous holder out of the way and eventually into the slide-holder receiver 22.

In one implementation the slide scanner 10 can be controlled by an electronic controller that monitors all its functions. The controller is connected to a scanning computer and responds to its instructions. The controller controls and synchronizes the speed of the scanning track 18, scanning stage 20 and focusing tube 510 providing an automated scanning of the plurality of slides. All other operating parameters as scan distance, sequencing of holders, intensity and frequency of the illuminator etc. can be also programmed and controlled by the controller. On start-up the focus, scanning stage and track drive are all moved to a "home" starting position.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. An automated slide scanning system, the system comprising:
    an illumination system to illuminate an object carried on a slide and to produce a returning light;
    a slide dispenser being configured to hold a plurality of slide holders, each of the slide holders comprising a plurality of slides, the slide holders being stacked vertically within the slide dispenser;
    a motorized scanning track having a first end attached to the slide dispenser and a second end, the scanning track having a retainer means connected to the scanning track to grab and pull the slide holder out of the slide dispenser onto the scanning track, the scanning track configured to move such slide holder in one direction along a X-axis;
    a focusing unit with a focusing tube, the focusing unit configured to provide a sub-micron, backlash free, vertical movement of the focusing tube and a leverage to magnify a range of such vertical movement, the focusing unit comprising:
        a body with a head to support the focusing tube;
        at least one elongated substantially rigid arm perpendicular to said head, the arm having a first end integrally joined to the head and a second end, the second end of the at least one arm being configured to flex in vertical direction when a force is applied thereon;
        an elongated substantially rigid lever pivotally connected to a hinge, the lever having a first end linked to the head and a second free end, the lever being parallel to and spaced apart from said at least one arm; and
        a drive mechanism having a cam coupled to a motor, the cam being in constant contact with the lever, the drive mechanism being designed to flex the lever toward the at least one arm so that it applies force to the arm such that the at least one arm moves up and down in vertical direction depending on the applied force, the head of the focusing unit moving simultaneously with the at least one arm but in opposite direction, wherein a plurality of images at various focus depths are captured from each illuminated object as the focus tube move down and up, the range of the vertical movement of the head is adjusted by a re-positioning of the hinge along a length of the lever and a point of contact between the lever and the drive mechanism;
    a motorized scanning stage configured to support the focusing unit, the scanning stage having a drive mechanism configured to move the scanning stage along with the focusing unit, back and forward, in Y direction;
    a slider holder receiver attached to the second end of the scanning track and configured to receive the scanned slide holders;
    at least one image detector to capture said returning light and to produce a plurality of images at various focus depths; and
    a controller to synchronize the drive of the scanning track, the drive of the scanning stage and the drive of the focusing unit to provide an automated scanning of the plurality of slides in each of the slide holders.

2. The system of claim 1, wherein the illumination system is connected to the scanning stage and moves together with the scanning stage and the focusing unit, back and forward, in Y direction.

3. The system of claims 1 or 2, wherein the illumination system comprises one or more LEDs.

4. The system of claim 1, wherein the scanning track further comprises a driving means having a motor and an endless belt, the retaining means connected to the endless belt, wherein the retaining means are being configured to grab the slide holder that is at a bottom of the slide holder dispenser, and to hold such slide holder throughout a scanning process and to release such slide holder at end of the scanning process.

5. The system of claim 4, wherein the driving means of the scanning track further comprise a limit switch to trigger the retaining means to grab the slide holder and an additional limit switch to indicate a start-of-travel position of the scanning track.

6. The system of claim 1, wherein the focusing unit further comprises a follower connected to the lever, wherein the cam is being adapted to act to the lever indirectly through the follower.

7. The system of claim 1, wherein the cam has an eccentric geometry.

8. The system of claim 1, wherein the focusing unit further comprises a biasing means acting to the first end of the lever in one direction to ensure that the cam is in constant contact to the lever.

9. The system of claim 1, wherein the image detector includes at least two detectors being configured to produce a plurality of images at various focus depths, to record a position of a slide or a position of a particular feature of the object carried on the slide and/or to detect edges of the object carried by the slide.

10. The system of claim 1, wherein the image detector includes at least three detectors.

11. The system of claim 1, wherein the controller is an electronic controller that controls at least one of a scan distance, sequencing of slide holders and intensity and frequency of the illumination system.

12. A focusing unit configured to provide a sub-micron, backlash free, vertical movement of a focusing tube and a leverage to magnify a range of the vertical movement, the focusing unit comprising:
    a body having a head for supporting the focus tube;
    at least one elongated substantially rigid arm projecting perpendicularly from the head, the at least one arm having a first end integrally joined to the head and a second end, the second end of the at least one arm being configured to flex in vertical direction when a force is applied thereon;
    a lever having a substantially rigid body, the lever being pivotally connected to a hinge and having a first end being linked to the head and a second free end, the lever being parallel to and spaced apart from said at least one arm; and
    a drive mechanism having a cam coupled to a motor, the cam being in a continuous contact with the lever, the drive mechanism being designed to flex the lever toward the at least one arm so that it applies force to the arm such that the at least one arm moves up and down in vertical direction depending on the applied force, the head of the focusing unit moving simultaneously with the at least one arm but in opposite direction, the range of the vertical movement of the head is adjusted by a position of the hinge along a length of the lever and a point of contact between the lever and the cam,
    wherein a plurality of images at various focus depths are captured from each illuminated object as the focus tube move down and up.

13. The focusing unit of claim 12, wherein the cam has an eccentric geometry.

14. The focusing unit of claim 12, further comprising a follower connected to the lever, wherein the cam acts to the lever indirectly through the follower.

15. The focusing unit of claim 12, further comprising a biasing means configured to act to the lever in one direction to provide a constant contact between the cam and the lever.

\* \* \* \* \*